United States Patent [19]
Huber

[11] 4,454,459
[45] Jun. 12, 1984

[54] METHOD OF CONTROLLING THE SPEED OF A DRILL, HAMMER-DRILL, OR ROTARY HAMMER AND APPARATUS THEREFOR

[75] Inventor: Siegfried Huber, Johannesberg, Fed. Rep. of Germany

[73] Assignee: Black & Decker Inc., Newark, Del.

[21] Appl. No.: 231,283

[22] Filed: Feb. 4, 1981

[30] Foreign Application Priority Data

Feb. 5, 1980 [EP] European Pat. Off. ........ 80100577.8

[51] Int. Cl.³ ............................................. H02P 5/16
[52] U.S. Cl. .................................. 318/305; 318/400; 318/484
[58] Field of Search ............... 318/162, 163, 305, 306, 318/308, 385–388, 391–393, 397, 398, 400, 484

[56] References Cited

U.S. PATENT DOCUMENTS

| | | | |
|---|---|---|---|
| 3,231,809 | 1/1966 | Greer | 318/400 |
| 3,753,066 | 8/1973 | Sailer | 318/305 |
| 3,835,357 | 9/1974 | Holzer | 318/327 |
| 4,042,966 | 8/1977 | Newell et al. | 318/484 X |
| 4,249,118 | 2/1981 | Roof | 318/305 |

FOREIGN PATENT DOCUMENTS

| | | |
|---|---|---|
| 2048192 | 10/1971 | Fed. Rep. of Germany . |
| 2358618 | 5/1974 | Fed. Rep. of Germany . |
| 2334013 | 1/1975 | Fed. Rep. of Germany . |
| 568679 | 10/1975 | Switzerland . |
| 1442487 | 7/1976 | United Kingdom ................ 318/305 |

Primary Examiner—J. V. Truhe
Assistant Examiner—W. E. Duncanson, Jr.
Attorney, Agent, or Firm—Walter Ottesen; Ronald B. Sherer; Edward D. Murphy

[57] ABSTRACT

The invention is directed to a method and apparatus for controlling the speed of an electronically controlled drill, hammer-drill or rotary hammer driven by an electrical motor wherein the rotational speed is first raised from zero to a predetermined start-drill speed and thereafter, from the start-drill speed up to the working speed. The rotational speed is held automatically at the start-drill speed for a predetermined time interval. The speed of the motor is sensed by a speed sensing device which includes a magnet ring coupled to the output shaft of the motor and a sensor positioned adjacent the periphery of the magnet ring. The speed control circuitry of the invention is housed within a casing which includes a depending portion for supporting the sensor in the proper operative position relative to the magnet ring.

12 Claims, 5 Drawing Figures

FIG. 2

METHOD OF CONTROLLING THE SPEED OF A DRILL, HAMMER-DRILL, OR ROTARY HAMMER AND APPARATUS THEREFOR

BACKGROUND AND SUMMARY OF THE INVENTION

The present invention relates to power tools and in particular to a method and apparatus for controlling the rotational speed of an electronically-controlled drill, hammer-drill or rotary hammer. The control circuit of the present invention provides a controlled start-up routine whereby the rotational speed of the motor is first raised from zero to a predeteremined start-drill speed and thereafter from the start-drill speed to the working speed. The invention is also applicable to a drill, hammer-drill or rotary hammer equipped with an on-off switch and with an electronic control circuit connected to the motor for adjusting the start-drill speed and the working speed.

German Pat. No. 20 55 859 discloses an arrangement for a drill or hammer-drill wherein the rotational speed is increased from zero to the adjusted start-drill speed by actuating an on-off switch having two on-positions from the off position. In the first on-position, the operator can operate the tool in the start-drill mode. In order to bring the tool from the start-drill speed to the working speed, the operator must bring the on-off switch manually into the second on-position wherein a potentiometer tap is rendered operative. The position of the potentiometer tap determines the working speed so that the speed is increased when the switch is switched into the second on-position.

Thus, according to the known method and apparatus, the transition from the start-drill speed to the working speed must be achieved by a manual actuation. Accordingly, it is an object of the invention to simplify the transition from the start-drill speed to the working speed.

To achieve this object of the invention, a method of the invention provides that the rotational speed is automatically held at the start-drill speed for a predetermined time period whereby the speed is increased to the start-drill speed at a constant acceleration and from the start-drill speed to the working speed with the same acceleration.

According to the method of the invention, the ascent of the rotational speed is automatically interrupted for a predetermined time interval when the start-drill speed is reached so that the operator has this time interval at his disposal for starting a bore in the work. Thereafter, the speed increases automatically so that the operator does not have to actuate a switch or take any other action.

In addition, a drill, hammer-drill or rotary hammer equipped with an electronic control circuit according to the present invention incorporates a control unit for interrupting the ascent of the rotational speed for a predetermined time interval when it reaches the start-drill speed. This time interval is preferably adjustable so that the operator can select the length of time during which the start-drill speed is to be available to him in dependence upon the particular application required.

In order that the portable tool can be utilized without interrupting the ascent of the rotational speed, the tool can be equipped with an on-off switch having two on-positions. In the first on position, the switch can activate the control unit and, in the second on-position the interruption of the ascent in rotational speed can be made ineffective so that by a movement of the on-off switch from the off position directly to the second on position, the rotational speed will continue to increase uninterrupted from zero to the working speed.

A further object of the present invention is to provide a drill, hammer-drill, or rotary hammer incorporating a speed control apparatus as descrbed herein which is relatively inexpensive and easily installed during assembly of the tool so as to minimize the incremental cost of manufacturing the tool.

To achieve this object of the invention, the solid-state electronic control circuitry according to the present invention is contained within a housing located above the motor which mates with the left-half and right-half outer housing members and serves as the top surface of the tool housing. The forward end of the control circuit housing includes an integral depending portion for supporting the speed sensing coil in operative relationship with the magnet coupled to the output shaft of the motor between the armature and the cooling fan. In this manner, the installation of the control circuit housing automatically properly positions the speed sensing coil relative to the magnet, thereby simplifying assembly of the tool.

Additional objects and advantages of the present invention will become apparent from a reading of the detailed description of the preferred embodiment which makes reference to the following set of drawings in which:

BRIEF DESCRIPTION OF THE DRAWINGS

FIG. 2 shows a circuit arrangement for a drill, hammer-drill or rotary hammer containing the semi-conductor component of FIG. 1;

FIG. 5 is an end view of the motor housing and control circuit housing viewed along line 5—5 of FIG. 4.

DETAILED DESCRIPTION OF THE PREFERRED EMBODIMENT

Figure 3:
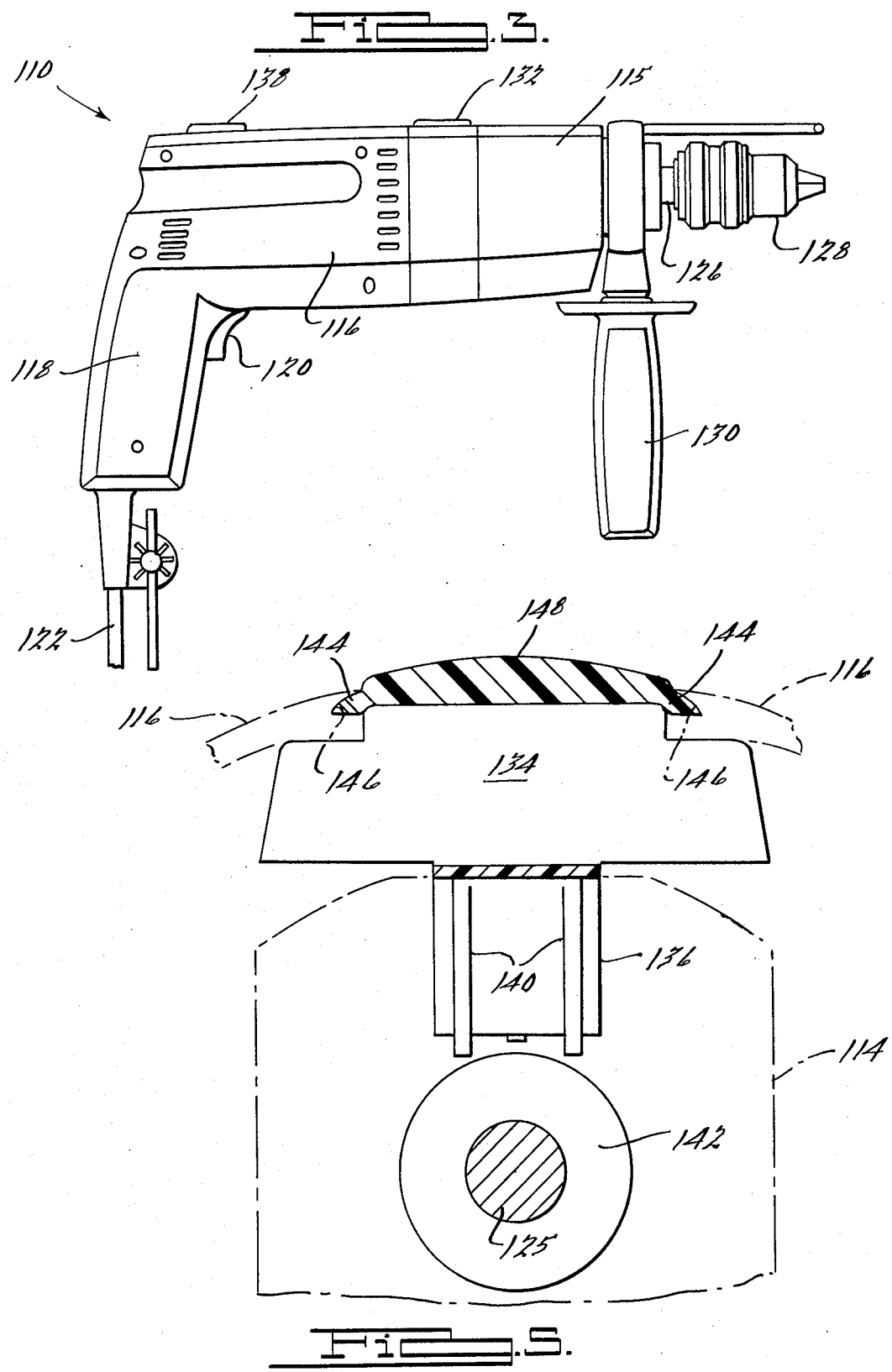
FIG. 3 is a side elevational view of a hammer-drill incorporating a speed control system according to the teachings of the present invention.
Figure 4:
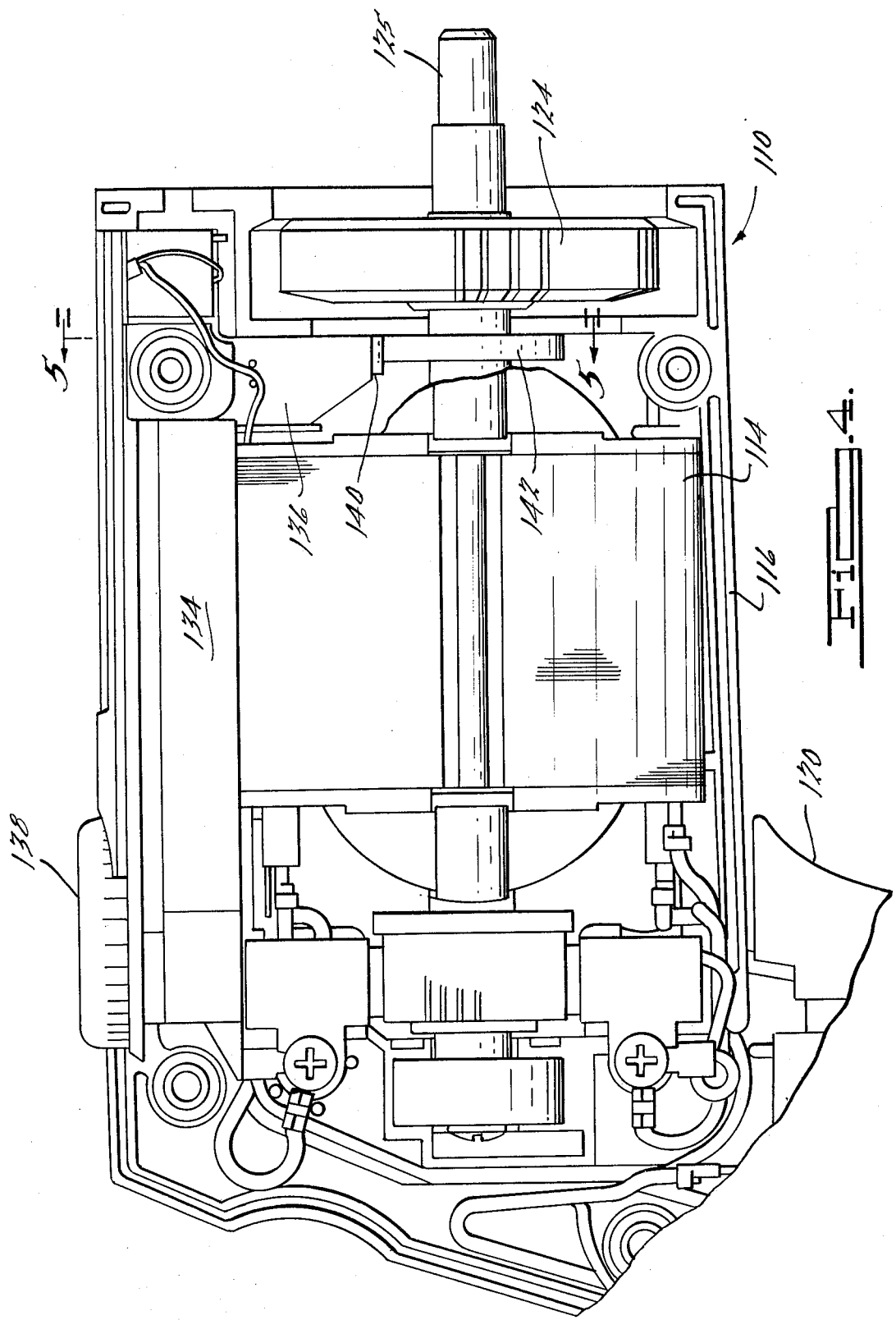
FIG. 4 is an enlarged cutaway view of the interior of the motor housing.

Referring initially to FIGS. 3 and 4, an impact or hammer drill 110 incorporating a speed control arrangement according to the present invention is shown. It is to be emphasized that although the preferred embodiment herein discloses a hammer drill to which the present invention is particularly suited, the speed control system of the present invention is applicable to other types of power tools including rotary hammers and conventional drills.

The hammer drill 110 is conventional in overall layout, comprising a motor 114 disposed within the outer tool housing 116 which in part defines a pistol grip-type handle 118 incorporating a two-position trigger-type switch 120. Power to the tool 110 is supplied via the usual power cord 122 extending from the bottom of the handle 118. A fan 124 is affixed to the shaft 125 of the motor 114 to facilitate cooling of the tool 110. In the preferred embodiment the motor 114 drives an output spindle 126 through the three-speed gear mechanism (not shown) which is disposed in a gear case 115 fastened to the forward end of housing 116. A detailed description of the preferred type of three-speed gear mechanism may be found in copending U.S. application entitled Three-Speed Gear Mechanism For A Power Tool, Ser. No. 060,437, filed July 25, 1979, assigned to the assignee of the present application. The spindle 126 extends outwardly beyond the front of gear case 115 and has affixed to its exposed end a chuck 128 for securing a drill bit thereto. An additional depending handle 130 is mounted to the front end of gear case 115 to provide means for supporting the forward end of the tool 110. Furthermore, a rotary select knob 132 exposed through an opening in the top of gear casing 115 is provided for selecting between hammer drill or drill only operation of the tool 110.

With particular reference to FIG. 4, the solid-state electronic control circuitry of the present invention is mounted on a circuit board that is contained within a casing 134 located above the motor 114. Projecting upwardly from the rearward end of the casing 134 is a speed control knob 138 for setting the desired rotational speed of the motor. The control knob 138 is connected to a potentiometer (P) mounted to the circuit board contained within casing 134. As will subsequently be described in greater detail, the setting of potentiometer (P) establishes the potential of the reference signal provided to the speed control circuit which controls the rotational speed of the motor in accordance with the reference voltage.

Motor speed information is provided to the speed control circuit by a speed sensor or tachogenerator 140, which in the preferred embodiment comprises a magnetically responsive Hall-effect sensor which operates in conjunction with a magnet ring 142 coupled to the output shaft 125 of the motor 114 between the armature and the cooling fan 124. In particular, the sensor 140 is operatively positioned adjacent the periphery of the magnet ring 142 so that as magnet ring 142 is rotated by motor shaft 125, electrical pulses are generated by sensor 140 at a frequency directly related to the rotational speed of the motor 114.

As best shown in FIG. 5, the tachogenerator 140 is supported adjacent magnet ring 142 by an integral downwardly depending portion 136 of casing 134, which serves to automatically properly position the sensor 140 in operative relationship relative to magnet ring 142 upon installation of the casing within the tool housing 116. In particular, it will be noted that casing 134 contains a pair of longitudinal outwardly extending flanges 144 which are adapted to mate with corresponding grooves 146 formed in the upper edges of the left-half and right-half members of tool housing 116. Accordingly, when the tool is assembled, the casing 134 is securely retained between the left-half and right-half housing members, thereby fixedly locating the position of casing 134 relative to motor 114 and thus insuring the accurate positioning of sensor 140 relative to magnet ring 142. In addition, when the two half-sections of tool housing 116 are bolted together during final assembly of the tool, casing 134 is tightly wedged therebetween to prevent the casing 134 from vibrating relative to housing 116 during operation of the tool which could result in damage to the electronics contained therein. Furthermore, it will be appreciated that the utilization of the casing 134 as the top surface 148 of the tool body minimizes the incremental increase in the size of the tool necessary to house the electronic speed control circuitry.

Figure 1:
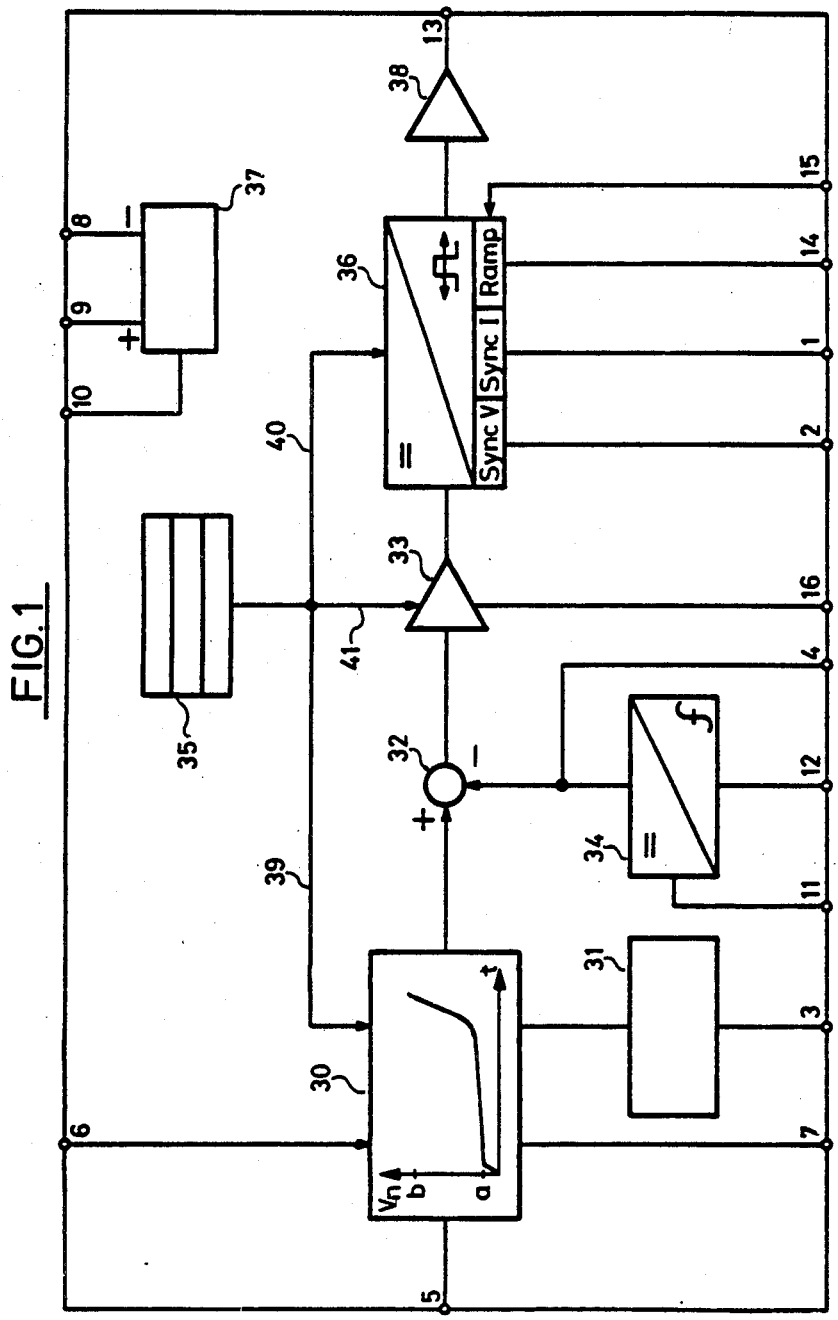
FIG. 1 is a block diagram showing the circuit of a monolithic semi-conductor component containing the control unit for interrupting the ascent of the rotational speed.

The block schematic diagram of FIG. 1 illustrates schematically the circuit configuration of a semi-conductor component sold commercially by the Motorola Company under the designation TDA 1085. This component includes a control unit 30 to which is applied a reference voltage at terminal 5. This reference voltage is of a predetermined magnitude and corresponds to the desired rotational speed. As the transfer characteristic indicates, the control unit 30 generates an output voltage Vn which changes as a function of time: first, the voltage Vn increases from zero to a value a; then, the voltage Vn remains at this value for a predetermined time interval; and, then increases to a value b. The time interval at which the voltage remains at the value a is determined by an appropriate control signal applied at terminal 7 and the value b is determined by the magnitude of the voltage applied at terminal 5. The ascent from zero to the value a and then the later ascent from the value a to the value b both take place at the same slope.

The output voltage of the control unit 30 is fed to a comparator 32; however, a voltage without the substantially constant voltage value a is applied to the comparator 32 if a corresponding control signal is supplied to the control unit 30 at terminal 6. A voltage corresponding approximately to the actual rotational speed is also applied to the comparator 32. This voltage is generated with the aid of component 34 to which a frequency signal can be applied via terminal 12. The component 34 transforms the frequency signal into a direct-current voltage and, under other operating conditions, a corresponding direct-current voltage can be applied to terminal 11.

The output voltage of the comparator 32 is applied to a transformer 36 via the control amplifier 33. The transformer 36 transforms the direct-current output voltage of the comparator 32 voltage to a proportional firing angle positioning within the voltage half-waveform supplied by the line. A sawtooth generator is synchronized via resistor R14 (FIG. 2) to the line voltage at terminal 2 which recognizes the zero crossover of the line voltage. In addition, the current zero crossover is supplied to the logic at terminal 1 via resistor R15 (FIG. 2) to guarantee that the optimum firing angle is provided in the event of a phase displacement.

The ramp of the sawtooth generator is built up at terminal 14 with the aid of a capacitor C6 (FIG. 2) which is discharged by a current source set by resistor R8 (FIG. 2) on terminal 15. When the input voltage of control amplifier 33 crosses the ramp of the sawtooth generator, a calibrated square-wave pulse is produced at the crossover point and fed to the amplifier 38 and serves in the conventional manner as the firing control of a triac arrangement. The duration of the switched-on time of this triac arrangement is dependent upon the point in time when the pulse is provided by the transformer 36; thus, the earlier the pulse is delivered, the longer will the triac arrangement conduct. The larger the difference detected by the comparator 32 between the output voltage of the control unit 30 and the voltage corresponding to the actual value of the rotational speed, the earlier will the pulse become available, referenced to the last crossover of the supply voltage and the greater will be the rotational speed to be regulated.

The semi-conductor component of FIG. 1 incorporates a current-limiting unit 31 which however is of no interest with respect to the above-mentioned situation so that the current-limiting unit 31 can be controlled via terminal 3 in such a manner that the magnitude of the current at which it becomes effective can lie far above the actual current magnitudes which occur. Further, a monitoring unit 35 is provided for monitoring the voltages corresponding to the desired and actual rotational speeds and, when a fault occurs, the monitoring unit 35 acts on three levels via lines 39, 41 and 40 to effect resetting of the control unit 30, control amplifier 33 and the transformer 36 respectively.

The semi-conductor component of FIG. 1 also includes a voltage regulating unit 37 which provides direct-current supply voltages via terminals 8 and 9 while terminal 10 can lie at the same polarity of the supply voltage as terminal 9.

Figure 2:
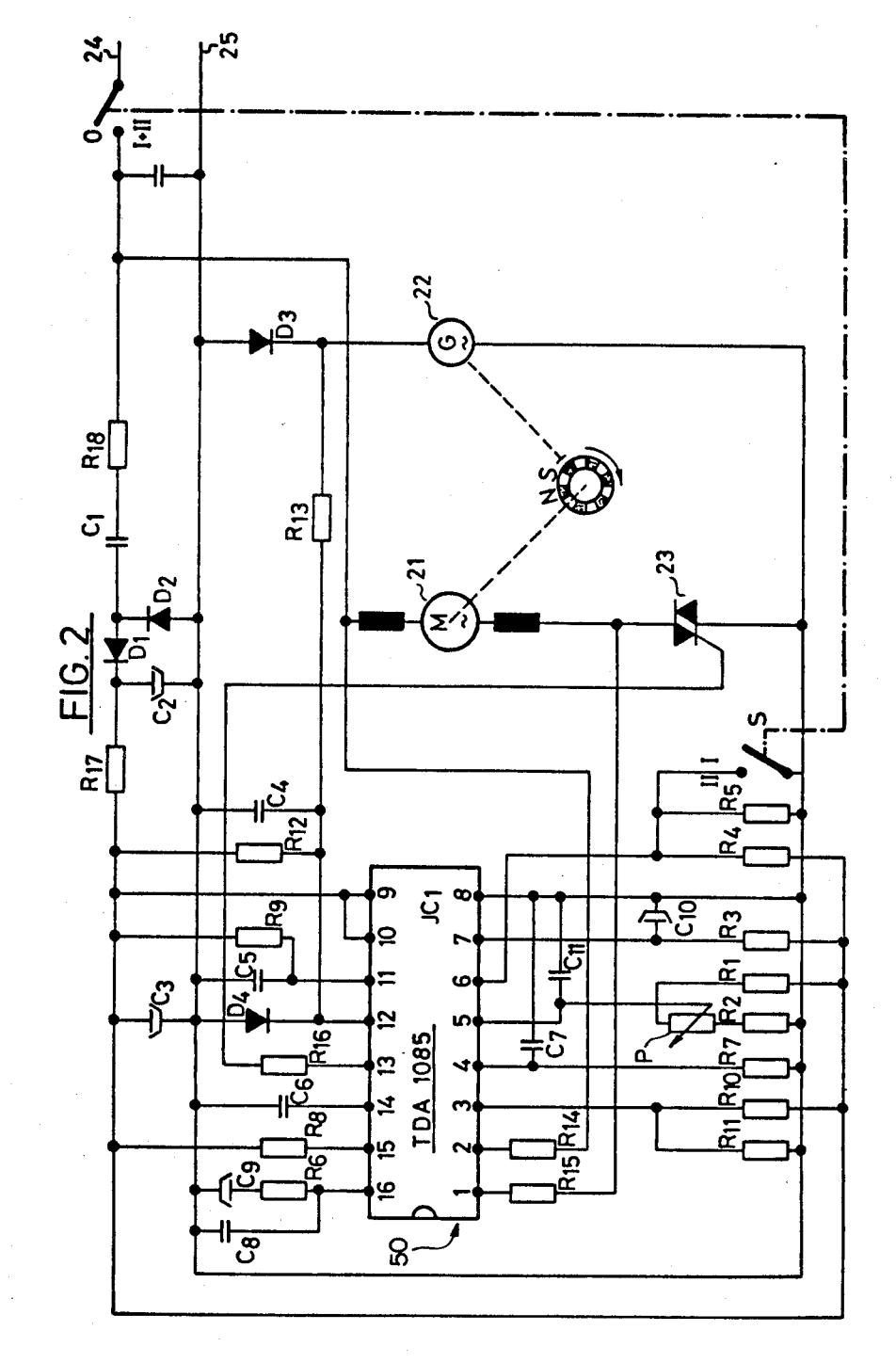

The circuit arrangement for controlling a hammer-drill incorporating the semi-conductor component of FIG. 1 is shown in FIG. 2 wherein this component is identified by reference numeral 50 and the designation TDA 1085. In this circuit arrangement, the motor 21 of the hammer-drill is arranged between terminals 24 and 25 of line voltage source with a triac 23 interposed without showing the on-off switch which is conventionally connected between the line voltage and the motor. The line voltage can be for example 115 volts a.c. A network component made up of diodes D1, D2, resistors R17, R18 and smoothing and filtering capacitors C1, C2, C3 is provided and delivers the supply voltage from which the different control voltages of the component 50 are derived.

A voltage divider, comprised of resistors R1 and R2 and potentiometer P, is connected to terminal 5 of the component 50. The potentiometer P provides the reference voltage at terminal 5 corresponding to the desired value of the rotational speed of the hammer-drill, this desired value corresponding to the value b in FIG. 1. By adjusting the potentiometer P, the magnitude of the reference voltage can be changed. Capacitor C11 connected to the potentiometer tap serves to smooth voltage variations which can develop, for example because of vibrations occurring during the hammer-drill operation.

The divider made up of resistor R3 and capacitor C10 supplies a voltage to input terminal 7 which determines the length of the time interval during which the start-drill rotational speed (a in FIG. 1) is held at its value. The length of this time interval can be changed by appropriate selection of the resistor R3. The voltage divider comprised of resistors R4 and R5 provides a voltage to input terminal 6 by means of which the magnitude of the start-drill speed is determined and, by bridging the resistor R5 with the aid of a switch S, the output voltage of the control unit 30 (FIG. 1) will continue to ascend without interruption. The switch S when closed represents the second position of the two-position trigger switch of the hammer-drill. When the operator actuates this switch into the second position, the start-drill mode is bypassed and the rotational speed of the hammer-drill increases from zero speed directly to the working speed without interruption.

As already mentioned, the current-limiting unit 31 (FIG. 1) delivers a voltage which is so selected that no current limitation occurs during operation and correspondingly, the resistors R10 and R11 are selected so that a corresponding voltage is applied to terminal 3.

A parallel circuit made up of resistor R7 and capacitor C7 is provided at input terminal 4 and serves to smooth the output signal of the frequency converter 34 (FIG. 1), while pulses from the tachogenerator 22 are fed to converter 34 via a current-limiting resistor R13. The tachogenerator 22, as previously described, generates output pulses corresponding to the rotational speed of the motor 21. These output pulses are converted into a direct-current voltage in component 34 in dependence upon their frequency. This direct voltage is smoothed by means of the divider made up of resistors R9 and capacitor C5 at the input terminal 11 while the diodes D3 and D4 connected to resistor R13 provide protection against voltage spikes. The divider made up of resistor R12 and capacitor C4 serves a smoothing function.

A parallel circuit comprising a series branch made up of the resistor R6 and capacitor C9 on the one hand, and capacitor C8 on the other hand, is connected to terminal 16 of the component 50. This parallel circuit determines speed response, that is, the quickness with which the actual speed is returned to the desired speed after a deviation of the actual speed from the desired or reference speed.

Voltages from the motor 21 are applied to inputs 1 and 2 via resistors R14 and R15 in order to account for a phase displacement between current and voltage when controlling the triac 23 while the inputs 14 and 15 are utilized to build the ramp of the sawtooth. The amplified output signals of the transformer 36 appear at output 13 and serve to control the triac 23 via resistor R16 while the component 50 is supplied with a supply voltage via inputs 8, 9 and 10.

By means of the illustrated circuit arrangement, pulses are generated at the output 13. The length of these pulses serve to control the firing angle of the triac 23 and therefore the drive of the motor 21. The length of these pulses further correspond to the form of the curve shown in the control unit 30 in FIG. 1 so that the motor 21 is first brought to a start-drill speed (a in FIG. 1) having a magnitude determined by the voltage divider of R4 and R5. The motor is then held at this start-drill speed for a time interval whose length is determined by a divider made up of resistor R3 and capacitor C10. Thereafter, the rotational speed of the motor ascends from the start-drill speed to the working speed (b in FIG. 1) with the magnitude of the working speed being determined by the setting of the potentiometer P.

While the above description constitutes the preferred embodiment of the present invention, it will be appreciated that the invention is susceptible to modification, variation and change without departing from the proper scope or fair meaning of the accompanying claims.

What is claimed is:

1. A method of controlling the speed of an electrically controlled drill, hammer-drill or rotary hammer driven by an electric motor while performing on work, comprising the steps of:
   initially raising the rotational speed of the motor from zero to a predetermined start-drill speed;
   then maintaining the rotational speed of the motor at said predetermined start-drill speed for a predetermined time interval during which a bore is started in the work;
   at the end of said predetermined time interval automatically causing the rotational speed of said motor to rise to the desired working speed of said motor; and
   then maintaining the rotational speed of said motor at said desired working speed to complete said bore.

2. The method of claim 1, wherein the rotational speed is raised with constant acceleration to the start-drill speed and with the same acceleration from the start-drill speed to the working speed.

3. A portable electric power tool comprising an electric motor for driving an output spindle having connected thereto means for receiving a tool implement, speed sensing means for sensing the rotational speed of said motor and producing an output signal in accordance therewith, select means for selecting a desired working speed for said motor, and control circuit means for controlling the rotational speed of said motor in accordance with said output signal by initially raising the speed of said motor from zero to a predetermined start-drill speed, maintaining the rotational speed of said motor at said predetermined start-drill speed for a predetermined time interval, and thereafter automatically raising the rotational speed of said motor to said desired working speed and then maintaining the rotational speed of said motor at said desired working speed.

4. The portable electric power tool of claim 3 wherein said portable electric power tool is a drill, hammer-drill or rotary hammer.

5. The portable electric power tool of claim 3 further comprising an on/off switch having two positions wherein one of said ON positions is operable to cause said control circuit means to raise the speed of said motor from zero to said desired working speed without interruption in the ascent thereof.

6. A portable power tool such as a drill, hammer-drill, or rotary hammer, comprising:
   a main housing;
   a motor disposed within said main housing for driving an output spindle having connected thereto a chuck for receiving a tool bit;
   speed sensing means for sensing the rotational speed of said motor and producing an output signal in accordance therewith including a first member coupled to the output shaft of said motor for rotation therewith and a second stationary member positioned proximate the rotational path of said first member for sensing the rotational movement of said first member;
   control circuit means for controlling the rotational speed of said motor in accordance with the output signal from said speed sensing means; and
   a control circuit housing having contained therein said control circuit means, said control circuit housing being fixedly located within said main housing above said motor and including a downwardly projecting portion at its forward end thereof for supporting said second member in precise operative relation to said first member.

7. The power tool of claim 6 wherein said tool further includes a cooling fan coupled to the output shaft of said motor and said first member is coupled to the output shaft of said motor between the armature thereof and said cooling fan.

8. The power tool of claim 6 wherein said control circuit means is adapted to automatically control the start-up of said motor in accordance with a predetermined start-up routine comprising raising the rotational speed of said motor from zero to a first predetermined start-drill speed, and thereafter from the start-drill speed up to a predetermined working speed.

9. The power tool of claim 8 wherein said tool includes an on/off switch having two ON positions such that in one of said ON positions said control circuit means is adapted to control the start-up of said motor in accordance with said predetermined start-up routine and in the other of said ON positions, said control circuit means is adapted to raise the speed of said motor from zero up to said predetermined working speed without interruption in the ascent thereof.

10. A portable electric power tool such as a drill, hammer-drill, or rotary hammer, comprising:
    an electric motor for driving an output spindle having connected thereto means for receiving a tool implement;
    speed sensing means for sensing the rotational speed of said motor and producing an output signal in accordance therewith;
    control circuit means for controlling the rotational speed of said motor in accordance with said output signal; and
    said control circuit means including means for effecting a predetermined start-up routine when said control circuit is first energised whereby the speed of said motor is initially raised at a constant acceleration from zero to a predetermined start-drill speed, maintained at said start-drill speed for a predetermined time interval, and thereafter automatically raised at the same constant acceleration to a predetermined working speed at which the motor speed is maintained by said control circuit means.

11. The portable electric power tool of claim 10, further comprising an on/off switch having two ON positions, such that in one of said ON positions said start-up routine means is effective to control the start-up of said motor in accordance with said predetermined start-up routine, and in the other of said ON positions the operation of said start-up routine means is modified to raise the speed of said motor from zero up to said predetermined working speed without interruption in the ascent thereof.

12. A drill, hammer-drill or rotary hammer comprising:
    an electric motor for driving an output spindle having connected thereto means for receiving a tool implement;
    control circuit means for controlling the rotational speed of said motor in accordance with a predetermined start-up routine whereby the speed of said motor is initially raised from zero to a predetermined start-drill speed, maintained at said start-drill speed for a predetermined time interval, and thereafter automatically raised to a predetermined working speed; and
    an on/off switch having two ON positions such that in one of said ON positions said control circuit means is adapted to control the start-up of said motor in accordance with said predetermined start-up routine and in the other of said ON positions, said control circuit means is adapted to raise the speed of said motor from zero up to said predetermined working speed without interruption in the ascent thereof.

* * * * *